March 4, 1958     A. C. BOOTH     2,825,638
GRINDING WHEEL MANUFACTURE
Filed July 27, 1955
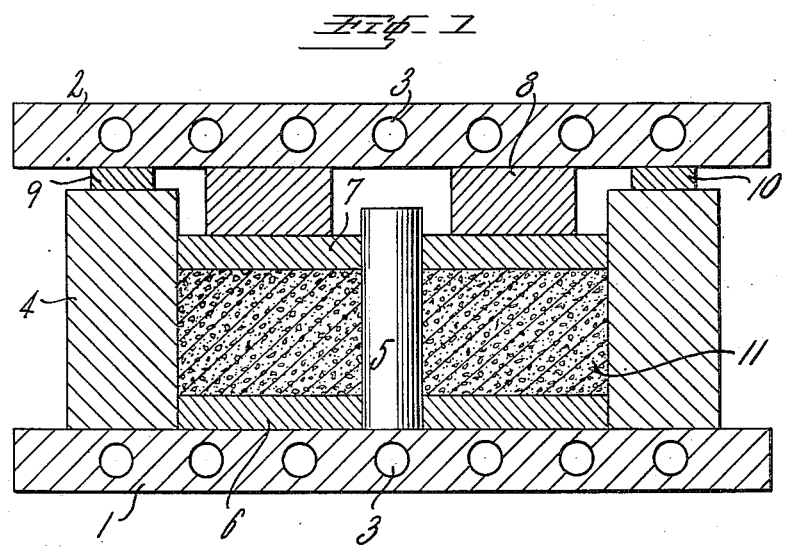
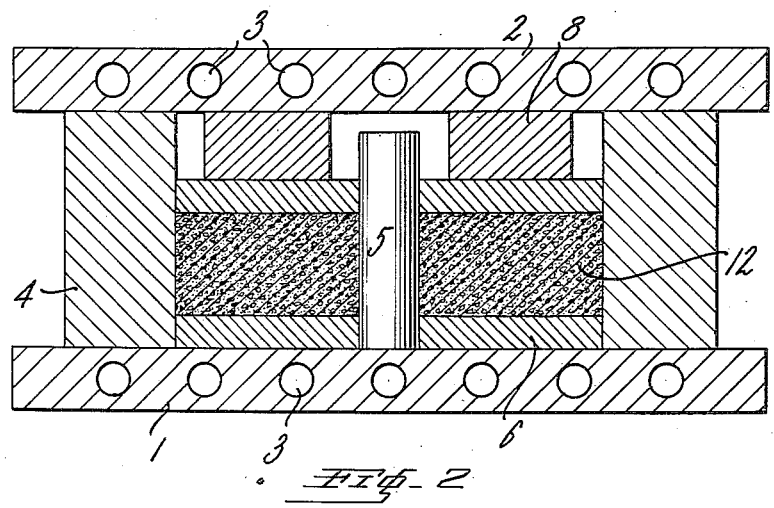
INVENTOR.
ARTHUR C. BOOTH
BY Robert J. Patterson
ATTORNEY

United States Patent Office 2,825,638
Patented Mar. 4, 1958

2,825,638
GRINDING WHEEL MANUFACTURE
Arthur C. Booth, Fort Wayne, Ind., assignor to United States Rubber Company, New York, N. Y., a corporation of New Jersey Application July 27, 1955, Serial No. 524,683

6 Claims. (Cl. 51—298)

This invention relates to grinding wheels and more particularly to grinding wheels which have grinding characteristics similar to those of grinding wheels bonded with hard rubber (or ebonite) but which can be made at much lower cost and in a much simpler manner by the use of the manufacturing method described and claimed herein. More particularly, my invention relates to a method of making such grinding wheels at a cost which is much lower than the cost of manufacturing rubber-bonded grinding wheels in the conventional manner. My invention relates to the novel method of making the grinding wheels and to the grinding wheels so produced.

The standard procedure for making rubber-bonded (bonded with either natural rubber or solid butadiene-acrylonitrile rubbery copolymer, i. e. Buna N) grinding wheels involves first milling the solid rubber to break it down, then milling vulcanizing and other rubber compounding ingredients into the rubber, then milling the abrasive grains into the rubber stock and forming slabs of unvulcanized rubber-abrasive stock, sheeting these slabs out to desired thickness, cutting annular rings from the sheeted stock, stacking the necessary number of these annuli one above the other in the mold cavity, and vulcanizing under heat and pressure.

Although rubber-bonded grinding wheels made in the manner just outlined have been recognized as possessing desirable grinding characteristics, nevertheless the cost of their production has been prohibitively high and the art has recognized that it would be highly desirable if this cost could be materially reduced. One of the major factors of the high cost of producing rubber-bonded wheels by prior art techniques has been the necessity of using mills for breaking down the rubber and incorporating the other ingredients therewith. These mills have represented an excessive capital investment, excessive maintenance cost, and excessive labor requirements.

Efforts have been made in the past to avoid the use of solid rubber in the manufacture of rubber-bonded wheels by using liquid depolymerized rubber instead of solid rubber. However, the resulting wheels have been softer than wheels made with natural rubber and for this reason have not been capable of being used generally in place of ordinary rubber-bonded wheels, although the depolymerized rubber-bonded wheels have been very successful for certain specific applications.

The principal object of my invention is to provide a grinding wheel having essentially the grinding characteristics of a hard rubber-bonded grinding wheel but which is much cheaper to manufacture than such a grinding wheel and does not give off the odor of burning rubber during use as is the case with conventional rubber-bonded grinding wheels. Another object is to provide a simple, commercially feasible and economical method of making such a wheel. Another object is to provide a method which possesses the simplicity and economy of the conventional method of making so-called resinoid-bonded grinding wheels. Numerous other objects of my invention will more fully hereinafter appear.

In the accompanying drawing:

Fig. 1 is a vertical sectional view of a typical arrangement of equipment for carrying out the first step of the hot-pressing procedure used in the manufacture of wheels according to my invention; and Fig. 2 is a view similar to Fig. 1 except that it portrays the final step in the hot-pressing procedure of my invention.

My invention is based upon the discovery that it is possible to make a highly successful grinding wheel having grinding characteristics similar to those of a hard rubber- or bonite-bonded grinding wheel by utilizing a liquid butadiene-acrylonitrile copolymer in forming the bond. More specifically, my invention is based upon the discovery that by using such a liquid butadiene-acrylonitrile copolymer in a certain manner and by carrying out the hot-pressing of the wheels in a novel two-stage manner described in detail hereinafter, it is readily possible to make wheels having the desirable grinding characteristics of ebonite-bonded wheels at far lower cost.

In the typical practice of my invention, I proceed as follows:

(1) One or more powdered thermosetting phenol-aldehyde resins, lime (calcium oxide) and one or more fillers of the type commonly used in grinding wheels, such as ordinary salt (sodium chloride), cryolite, etc., are thoroughly blended in the dry state in any suitable manner.

(2) A liquid butadiene-acrylonitrile copolymer (this is a well-known material which can be made for example in accordance with Frolich et al. U. S. Patent 2,500,983; commercial forms of this material are "Liquid Hycar #1312" made by the B. F. Goodrich Chemical Company and "Paracril Liquid B" made by the Naugatuck Chemical Division of United States Rubber Company) is commingled with furfural to form a solution of the liquid copolymer in the furfural. The relative proportions in this solution can range from 70% of the liquid copolymer and 30% of the furfural to 10% of the copolymer and 90% of the furfural, these percentages being by weight based upon these two ingredients and totaling 100%. The particular relative proportions used in a given formulation will depend upon the application to which the grinding wheel is to be put.

If desired, other materials can be dissolved in or admixed with the liquid copolymer-furfural solution. Examples are normally solid phenol-aldehyde resins which are soluble in the furfural-copolymer solution and dispersions of graphite in media which are soluble in the solution.

(3) The abrasive grains to be bonded are uniformly mixed with a powdered vulcanizing agent, almost invariably sulfur, in such a way as to uniformly suspend the vulcanizing agent throughout the abrasive grains and in fact effect coating of the abrasive grains (which are dry) with the powdered vulcanizing agent.

(4) The mixture of the abrasive grain and the vulcanizing agent is wetted with the solution of the liquid butadiene-acrylonitrile copolymer in the furfural. This is easily done by simply adding the solution to the vulcanizing agent-coated abrasive grain in any suitable kind of a mixing device, such as a paddle mixer, and mixing until the abrasive grain is thoroughly wetted. This wetting takes place very rapidly and usually this step will not consume over about one minute.

(5) The resulting wetted abrasive grains are then commingled with the dry powdered blend of the powdered thermosetting phenol-aldehyde resin, lime and filler in such a way as to coat the wetted grains with the blend of the dry powders and form a free-flowing, pourable, granular mix. This step can conveniently be carried out by placing a major proportion of the dry blend of the phenolic resin, lime and filler in a suitable mixer of the rotating type, adding the wetted abrasive grains, allowing mixing to continue until the abrasive grains are coated with the dry powder, there being an excess of dry powder unattached to abrasive grains at this point, adding a suitable amount of a known liquid pick-up agent, for example cresol or cresote oil or guaiacol, at a slow rate so that "balling-up" does not occur, this pick-up agent causing the remaining dry powder to be picked up and held by the abrasive grain. The remaining portion of the dry blend of phenolic resin, lime and filler is then added in relatively small portions alternately with suitable small portions of the pick-up agent, mixing being continued throughout such additions. In this way, all of the dry blend of the phenolic resin, lime and filler is attached to the abrasive grains and there is obtained a mixture which is granular, free-flowing and readily pourable so that it can be simply poured into the mold and levelled out therein in a manner similar to that used in making a resinoid-bonded wheel.

The nature of the liquid pick-up agent constitutes no part of my invention. Many such agents are known. Examples are: commercial cresol (so-called cresylic acid), creosote oil, and guaiacol. Two or more such pick-up agents can be used in combination.

(6) This granular mix is then poured into a pre-heated mold which is at a temperature of at least 300° F., typically 300 to 400° F., e. g. 340° F., and is levelled off therein in the conventional way. The usual precautions to prevent adhesion to the walls of the mold should be taken. For example all of the interior surfaces of the mold are lubricated with a suitable mold release agent such as an aqueous soap solution to prevent sticking.

(7) The mix is then subjected to heating in the mold at a temperature of at least 300° F. while applying relatively low pressure to the mix until the bond has been solidified by gelling and partial setting up. A preferred method of carrying out this step of my process is illustrated in Fig. 1 of the accompanying drawing to which reference will now be made.

In Fig. 1, reference numeral 1 denotes the lower stationary platen of a conventional press and reference numeral 2 denotes the upper movable platen, platens 1 and 2 being provided with the ordinary heating passageways 3. The mold cavity is formed by a ring 4, a central plug 5, an annular bottom plate 6, and an annular top plate 7. Above top plate 7 there is provided an annular spacer plate 8. Transverse spacer bars 9 and 10 are provided between ring 4 and upper platen 2 in order to insure that only very little pressure is applied to the granular mix, indicated by reference numeral 11, in the mold cavity during the first step of the hot-pressing technique. The pressure applied to the mix 11 during this first step will usually range from 1 to 500 pounds per square inch of the upper area of the mix 11, i. e. the side area of the wheel shape. Typically the pressure applied during this step will not exceed 100 pounds per square inch. The pressure applied in this step can be easily varied by varying the depth, i. e. vertical thickness, of the spacer bars 9 and 10.

As will be obvious, heat is transmitted from the platens 1 and 2 through metal parts 4, 5, 6, 7 and 8 into the mix 11 so as to effect the desired gelation and partial setting up of the mix.

During the step portrayed in Fig. 1, any volatile material can readily escape from the mixture 11 so that the formation of undesirable voids in the finished wheel is obviated. In this connection, a notable feature of my invention is that my mixture contains no water so that there is no problem of formation of voids by reason of the presence of moisture, as has been the case in prior art attempts to use rubber latex in the manufacture of rubber-bonded abrasive wheels.

(8) The resulting wheel shape is next confined under positive mechanical pressure of at least 1000 pounds per square inch of side area and is heated while so confined at a temperature of at least 300° F., typically 340° F., until curing of the bond is completed. The pressure applied in this step is usually between 1000 and 5000 pounds per square inch of side area. Typically this step is effected in the manner shown in Fig. 2 in the following way: After gelation and partial setting up of the bond during the first step of the hot-pressing technique, which will usually require about forty minutes at 340° F., the upper platen 2 of the press is elevated whereupon the spacer bars 9 and 10 are removed. The upper platen 2 is then lowered again under full hydraulic pressure while the application of heat by means of platens 1 and 2 and transmission through the metal parts 4, 5, 6, 7 and 8 into the granular shaped mass 11 is continued. As a result of the application of very high positive mechanical pressure during the step portrayed in Fig. 2, vertical contraction of the mixture 11 is effected and it is caused to be formed into a wheel shape 12 of substantially reduced thickness as compared to the mass 11 shown in Fig. 1. The high pressure applied during this final heating step causes substantial compaction and densification of the mass of the wheel so that a good dense pore-free wheel is obtained.

The final step, portrayed in Fig. 2, will usually require a time of from one and one-half to two hours to effect completion of the cure of the bond.

The upper limit of temperature in the two steps of hot-pressing operation is that temperature at which heat deterioration of the bond would occur. Usually these two steps will be carried out at temperatures of from 300 to 400° F.

If the preliminary heating (step 7 above) of the mixture under relatively low pressure to effect gelling and partial setting up were dispensed with, and the wheel shape were cured under high positive mechanical pressure applied throughout, as is customary in making resinoid-bonded wheels, the result would be a wheel which would exhibit decidedly inferior cutting action because it would load up with metal and pound excessively when unloading, resulting in the metal building up and being released in sheet form accompanied by excessive wheel loss due to pounding. In contrast, ebonite-bonded grinding wheels and wheels made in accordance with my invention are similar in efficiencies.

If the second step (step 8 above) of the hot-pressing technique, i. e. the step wherein the mixture is heated while confined under high positive mechanical pressure, were omitted, the result would be a wheel which would be excessively porous and spongy and which would be completely unsatisfactory as a grinding wheel because of its extreme softness and the extremely rapid rate of its deterioration under grinding conditions.

(9) The wheel shape is ejected from the mold and is dressed so that the outside diameter is concentric with the inside diameter. If desired, the side faces of the wheel can be "shot sided" to the desired thickness.

The following examples illustrate my invention in more details. These examples portray two grinding wheel formulations both of which were compounded and processed into grinding wheels in the manner described in detail above.

Example I

| | Parts by weight |
|---|---|
| #20 abrasive grain | 76.97 |
| "Liquid Hycar #1312 | 2.36 |
| Powdered thermosetting phenol-aldehyde resin ("Synvar GW2400") | 8.18 |
| Sodium chloride (about 200 mesh) | 2.10 |
| Furfural | 1.16 |
| Lime (CaO) | 2.22 |
| Cryolite | 4.68 |
| Liquid pick-up agent (mixture of approximately 75% "Carbosota" (creosote oil) and 25% Guaiacol) | 1.36 |
| Sulfur | 0.95 |

Wheels of a size known as "14 x 1 x 6," i. e., having an outside diameter of 14 inches, an inside diameter of 6 inches and a thickness of 1 inch, were made from the above formulation. These wheels were used to grind low carbon steel of a type similar to that known as "10–20." In a representative test, which lasted 5 minutes at a load of 90 pounds with the wheel operating at a peripheral speed of 9,000 feet per minute, the wheel loss was 53.7 cubic inches per hour and the rate of metal removal was 23.76 pounds per hour, giving an efficiency of .44.

*Example II*

| | Parts by weight |
|---|---|
| #20 abrasive grain | 77.73 |
| "Liquid Hycar #1312" | 0.29 |
| Powdered thermosetting phenol-aldehyde resin ("Bakelite #1364") | 7.02 |
| "Synvar GW2400" | 2.04 |
| Wetting agent (65.84% furfural, 1.78% of a dispersion of graphite in a petroleum hydrocarbon, 32.38% of dissolved thermosetting phenol-formaldehyde resin e. g. "Varcum 5476") | 2.47 |
| Lime | 1.97 |
| Cryolite | 6.90 |
| Pick-up agent (same as that used in Example I) | 1.52 |
| Sulfur | 0.11 |

Wheels of the size known as "14 x 1 x 6" were manufactured from the foregoing formulation in accordance with the above disclosure, the wetting agent being used in admixture with the liquid "Hycar." They were used to grind stainless steel in a series of tests. In a typical test, in which stainless steel was ground for 5 minutes under a load of 90 pounds at a peripheral surface speed of 9,000 feet per minutes, the wheel loss was 53.8 cubic inches per hour and the metal loss was 22.3 pounds per hour giving an efficiency of .41.

All parts and percentages mentioned in this specification and in the appended claims are by weight.

Having thus described my invention, what I claim and desire to protect by Letters Patent is:

1. The method of making a grinding wheel having grinding characteristics similar to those of a hard rubber-bonded grinding wheel which comprises uniformly mixing and coating abrasive grains with a powdered vulcanizing agent, wetting the resulting coated abrasive grains with a solution of a liquid butadiene-acrylonitrile copolymer in furfural, incorporating the resulting wetted abrasive grains with a dry powdered blend of a powdered thermosetting phenol-aldehyde resin, lime and filler in such a way as to coat the wetted grains with said blend and form a free-flowing pourable granular mix, filling a pre-heated mold with said free-flowing pourable granular mix, heating the mix at relatively low pressure in said mold at a temperature of at least 300° F. until the bond solidifies by gelling and partially setsup, confining the resulting shape under positive mechanical pressure of at least 1,000 lbs. per square inch, and heating it while so confined at a temperature of at least 300° F. until curing of the bond is completed, the temperature at no time being so high as to cause heat deterioration of the bond to occur.

2. The method of making a grinding wheel having grinding characteristics similar to those of a hard rubber-bonded grinding wheel which comprises uniformly mixing abrasive grains with a powdered vulcanizing agent thereby coating the abrasive grains while dry, wetting the resulting coated abrasive grains with a solution of a liquid butadiene-acrylonitrile copolymer in furfural, the ratio of said liquid copolymer to said furfural ranging from 70:30 to 10:90 on a weight basis, incorporating the resulting wetted abrasive grains with a dry powdered blend of a powdered thermosetting phenol-aldehyde resin, lime and filler in such a way as to coat the wetted grains with said blend and form a free-flowing pourable granular mix, filling a pre-heated mold with said free-flowing pourable granular mix, heating the mix at relatively low pressure in said mold at a temperature of between 300° and 400° F, until the bond solidifies by gelling and partially sets up, confining the resulting shape under positive mechanical pressure of between 1,000 and 5,000 lbs. per square inch and heating it while so confined at a temperature of between 300° and 400° F. until curing of the bond is completed.

3. A grinding wheel having grinding characteristics similar to those of a hard rubber-bonded grinding wheel and comprising abrasive grains bonded with a cured mixture of a liquid butadiene-acrylonitrile copolymer, furfural, a powdered thermosetting phenol-aldehyde resin, lime and filler, the ratio of said liquid copolymer to said furfural ranging from 70:30 to 10:90 on a weight basis.

4. The method of making a grinding wheel which comprises uniformly mixing and coating abrasive grains with a powdered vulcanizing agent thereby coating the abrasive grains while dry, mixing the resulting coated dry abrasive grains with a solution of liquid butadiene-acrylonitrile copolymer in furfural until the abrasive grains are thoroughly wetted, the weight ratio of said liquid copolymer to said furfural ranging from 70:30 to 10:90, incorporating the resulting wetted abrasive grains with a dry powdered blend of a powdered thermosetting phenol-aldehyde resin, lime and filler in such a way as to coat said wetted grains with said blend and thereby form a free-flowing pourable granular mix, placing said mix in a pre-heated mold, heating the mix at a pressure between 1 and about 500 lbs. per square inch in said mold at a temperature of between about 300° and about 400° F. until the mix gels and partially sets up, and thereafter confining the resulting shape under positive mechanical pressure of between 1,000 and 5,000 lbs. per square inch and heating it while so confined at a temperature of between about 300° and about 400° F. until curing of the bond is completed.

5. The method of making a grinding wheel which comprises uniformly mixing and coating abrasive grains with a powdered vulcanizing agent thereby coating the abrasive grains while dry, mixing the resulting coated dry abrasive grains with a solution of liquid butadiene-acrylonitrile copolymer in furfural until the abrasive grains are thoroughly wetted, the weight ratio of said liquid copolymer to said furfural ranging from 70:30 to 10:90, incorporating the resulting wetted abrasive grains with a dry powdered blend of a powdered thermosetting phenol-aldehyde resin, lime and filler and simultaneously adding a liquid pick-up agent at a rate to prevent said blend from balling-up and to coat said wetted grains with said blend and thereby form a free-flowing pourable granular mix, placing said mix in a pre-heated mold, heating the mix at a pressure between 1 and about 500 lbs. per square inch in said mold at a temperature of between about 300° and about 400° F. until the mix gels and partially sets up, and thereafter confining the resulting shape under positive mechanical pressure of between 1,000 and 5,000 lbs. per square inch and heating it while so confined at a temperature of between about 300° and about 400° F. until curing of the bond is completed.

6. An intermediate composition for the manufacture of grinding wheels having grinding characteristics similar to those of a hard rubber-bonded grinding wheel which comprises a free-flowing pourable granular mix of abrasive grains coated with a powdered vulcanizing agent, said coated grains being wetted with a solution of a liquid butadiene-acrylonitrile copolymer in furfural, said wetted grains being further coated with a powdered blend of powdered thermosetting phenol-aldehyde resin, lime and filler.

References Cited in the file of this patent

UNITED STATES PATENTS

| | | |
|---|---|---|
| 2,403,213 | D'Alelio | July 2, 1946 |
| 2,448,985 | Kuzmick et al. | Sept. 7, 1948 |
| 2,599,506 | Woddell et al. | June 3, 1952 |